United States Patent
Koch

(10) Patent No.: US 6,880,416 B2
(45) Date of Patent: Apr. 19, 2005

(54) DEVICE FOR ADJUSTING PARTS WHICH CAN MOVE IN RELATION TO EACH OTHER

(75) Inventor: Dietmar Koch, Gummersbach (DE)

(73) Assignee: Okin Gesellschaft fur Antriebstechnik mbH & Co.KG, Gummersbach (DE)

( * ) Notice: Subject to any disclaimer, the term of this patent is extended or adjusted under 35 U.S.C. 154(b) by 101 days.

(21) Appl. No.: 10/257,778

(22) PCT Filed: Mar. 24, 2001

(86) PCT No.: PCT/DE01/01145

§ 371 (c)(1),
(2), (4) Date: Oct. 15, 2002

(87) PCT Pub. No.: WO01/78556

PCT Pub. Date: Oct. 25, 2001

(65) Prior Publication Data

US 2003/0183027 A1 Oct. 2, 2003

(30) Foreign Application Priority Data

Apr. 15, 2000 (DE) .......................................... 10018742

(51) Int. Cl.$^7$ ............................. F16H 25/20; B66F 3/08
(52) U.S. Cl. .................. 74/89.35; 74/89.28; 74/424.72
(58) Field of Search ............................. 74/89.27, 89.28, 74/89.35, 89.37, 424.72

(56) References Cited

U.S. PATENT DOCUMENTS

| | | | | |
|---|---|---|---|---|
| 3,404,580 A | * | 10/1968 | Valenti ....................... 74/89.35 |
| 3,763,747 A | * | 10/1973 | Beichel et al. ................. 92/33 |
| 4,817,977 A | * | 4/1989 | Bookbinder ................. 280/304 |
| 4,858,481 A | * | 8/1989 | Abraham .................... 74/89.38 |

FOREIGN PATENT DOCUMENTS

| | | | |
|---|---|---|---|
| DE | 3910814 | 10/1990 | ............. B66F/3/08 |
| DE | 39 10 814 A1 | 10/1990 | ............. B66F/3/08 |
| DE | 4426937 | 11/1995 | ............. B66F/3/10 |
| DE | 19600326 | 7/1997 | ............. F15B/7/10 |
| DE | 197 11 773 | 9/1998 | ............. B66F/3/10 |
| WO | WO98/43001 | 10/1998 | ........... F16H/25/20 |

OTHER PUBLICATIONS

English translation of the specification of DE 39 10 814 A1 in col. 3, line 20 to col. 5, line 12.

* cited by examiner

*Primary Examiner*—David A. Bucci
*Assistant Examiner*—Timothy McAnulty
(74) *Attorney, Agent, or Firm*—Grossman Tucker Perreault & Pfleger, PLLC

(57) ABSTRACT

A device for adjusting parts which can move in relation to each other includes: a driveable threaded hollow spindle with inner and outer threads increasing in opposing directions; an inner spindle cooperating with the inner threads and connected to a first fixing device to secure the device to one of the moveable parts; and a propulsive tube cooperating with the outer threads via an outer nut. The propulsive tube is connected to a second fixing device enabling fixation on one of the parts which can move in relation to each other. The threaded hollow spindle may be mounted in a rotationally fixed and longitudinally displaceable manner on a catch device which can be rotationally driven around the axis of the hollow spindle.

11 Claims, 1 Drawing Sheet

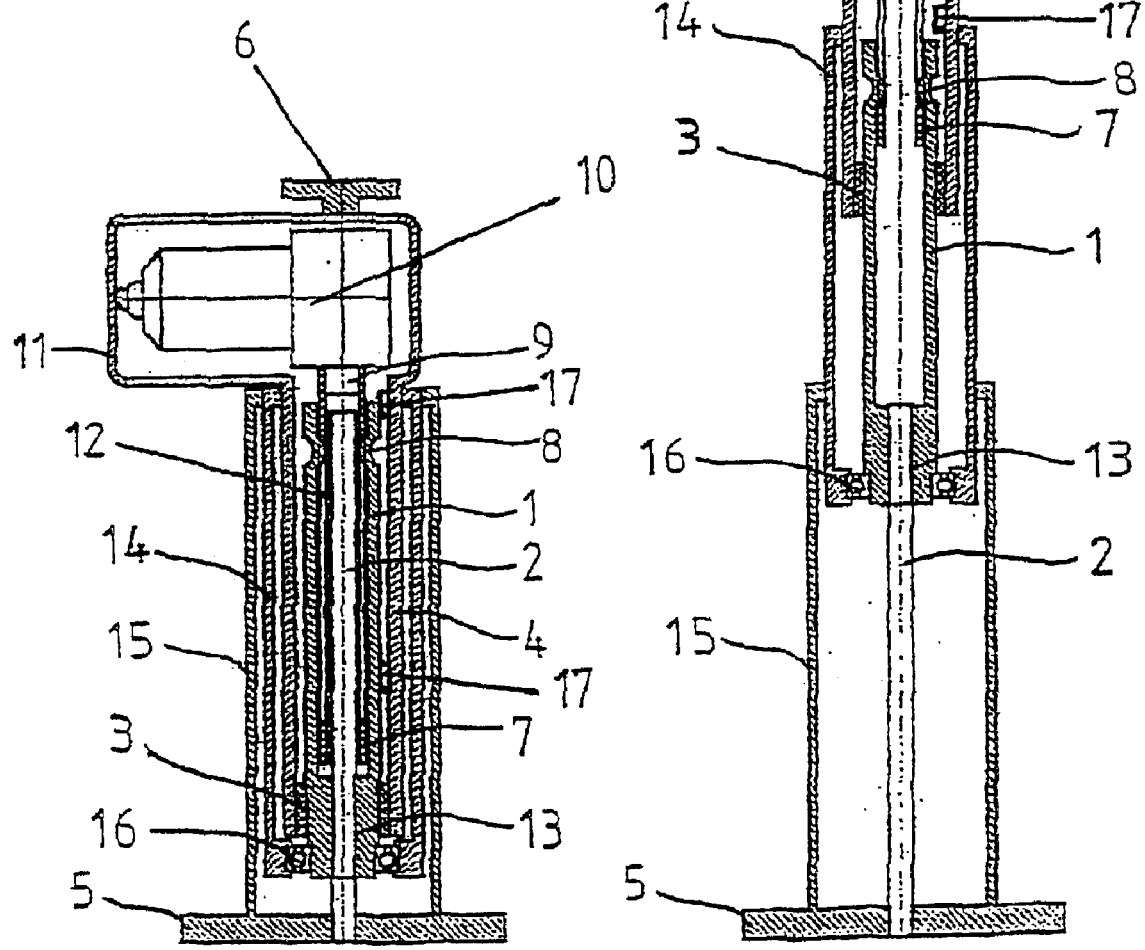

DEVICE FOR ADJUSTING PARTS WHICH CAN MOVE IN RELATION TO EACH OTHER

The invention relates to a device for adjusting parts which can move in relation to each other, especially parts of adjustable furniture, comprising a driveable threaded hollow spindle, whose inner and outer threads rise in opposing directions, an inner spindle which interacts with the inner thread of the threaded hollow spindle and which is connected to a first fixing device in order to secure the device to one of the moveable parts, and a propulsive tube which interacts with the outer thread of the threaded hollow spindle via an outer nut and is connected to a second fixing device enabling fixation of the device on another of the parts which can move in relation to each other, where the threaded hollow spindle is mounted in a rotationally fixed and longitudinally displaceable manner on a catch device which can be rotationally driven about the axis of the threaded hollow spindle, and where a guard is provided for the threaded hollow spindle that extends essentially over the length of the same.

A device of this kind enables longer travel paths between the fixing devices compared to conventional adjusting devices, which exclusively use a spindle with an outer thread and an adjusting nut that travels on it. While the travel path of such an adjusting device corresponds to the path travelled by the adjusting nut, the travel path of a device of the kind described in the opening paragraph corresponds to the sum of the path travelled by the nut on the threaded hollow spindle and the simultaneous displacement of the inner spindle. If the opposing pitches of the inner and outer threads of the threaded hollow spindle are the same, for example, twice the travel path can be achieved compared to a spindle equipped with only an outer thread.

A device of the kind described in the opening paragraph is known from DE 196 00 326 A1. In this device, the drive and the threaded hollow spindle form a single unit, where the drive motor is mounted on one end of the threaded hollow spindle and drives it via a worm gear pair. On said end, the inner spindle emerges from the threaded hollow spindle and its far end is connected to a first fixing device for connecting the device to one of the parts that can move relative to the other. Located on the opposite side of the drive motor are the outer nut, which interacts with the outer thread of the threaded hollow spindle, and the propulsive tube, on whose free end the second fixing device is mounted for connecting the device to another of the parts that can move relative to one another.

While the inner spindle and the propulsive tube are held in place by the fixing devices such that they cannot twist relative to the parts that can move relative to one another, the unit comprising the worm gear pair and the threaded hollow spindle is supported in a flat rail on the inner spindle and the unit comprising the propulsive tube and the outer nut. When the threaded hollow spindle is driven, this unit therefore moves together with the drive motor relative to the two fixing devices, thereby travelling towards the first fixing device by the distance of the travel path relative to the inner spindle, and towards the second fixing device by the distance of the travel path relative to the outer nut and the propulsive tube. Because the drive motor protrudes considerably beyond the already fairly wide threaded hollow spindle, the known device not only takes up rather a large amount of space, but also entails a risk of objects getting caught between the drive motor and the part connected to the first fixing device, in particular, as well as other safety risks when it is exposed on the outside of a piece of furniture, for example. In order to avoid such risks, the known device—if accessible from the outside—must be encased in a relatively large protective housing. If the device is used to adjust the height of a table, for example, the table must have a relatively thick support column that obstructs the user and is unsightly.

DE 39 10 814 A1 describes a generic device for adjusting parts that can move relative to each other, where the threads of the threaded hollow spindle and the inner spindle are protected by caps connected to them, each of which extends essentially over the length of the threaded hollow spindle and the inner spindle.

Consequently, the object of the present invention is to further develop a device of the kind described in the opening paragraph such that the thread of the threaded hollow spindle is better protected.

According to the invention, the object is solved in that the guard is designed as a telescopic tube, one end of which is guided in longitudinally sliding fashion on the propulsive tube and the other end of which is mounted in rotating and non-sliding fashion on the threaded hollow spindle. Advantageous embodiments are described in the sub-claims.

As a result of the design according to the invention, the catch device with the drive motor can be mounted in fixed position relative to the second fixing device connected to the propulsive tube, where the drive motor can be positioned immediately adjacent to the part capable of relative motion that is connected to the second fixing device. Because the inner spindle is mounted via the first fixing device in a fixed position relative to another of the parts that can move relative to one another, the threaded hollow spindle driven by the catch device goes through a rotational motion that causes displacement relative to the inside spindle, on the one hand, and displacement relative to the outer nut with the propulsive tube, on the other. In this context, the propulsive tube is mounted in a fixed position relative to the catch device in the longitudinal direction.

Because the drive motor with its housing can be positioned in the immediate vicinity of one of the parts that can move relative to the other, and is spaced apart from the part connected to the inner spindle by a distance at least equal to the length of the threaded hollow spindle, there is no risk of objects getting caught or any other safety problems during adjustment. A relatively slim housing that closely encases the threaded hollow spindle and the inner spindle is sufficient for protecting the threaded hollow spindle and the inner spindle on the outside. If the device according to the invention is used in a support column of a table to adjust the height of the table, for example, the support column can be of relatively slim design, thus allowing more leg-room for a person sitting or standing at the table and achieving an aesthetically pleasing appearance.

In a preferred embodiment of the invention, the catch device is designed as a profile tube, where a catch profile provided on the threaded hollow spindle engages its profile. In this configuration, the catch device can be mounted by very simple means on the threaded hollow spindle in a rotationally fixed and longitudinally displaceable manner.

One end of the profile tube is advantageously connected to the shaft of a drive motor in non-rotating fashion. The drive motor can have a worm gear pair, for example, so that it can be arranged in a relatively slim, laterally protruding housing, e.g. underneath a tabletop of adjustable height.

In a preferred embodiment of the invention, one end of the profile tube extends into the threaded hollow spindle and has a minimum inside diameter that is greater than the outer thread diameter of the inner spindle. In this context, the catch profile is mounted on the inside of the threaded hollow spindle on the end facing the profile tube.

The end of the threaded hollow spindle facing away from the profile tube is expediently provided with a constriction, in which the inner thread is formed. The rest of the inside area of the threaded hollow spindle is designed to accommodate the profile tube in sliding fashion. The constriction can be an integral part of the threaded hollow spindle, or firmly connected as a separate nut to a tubular hollow shaft.

In a simple configuration, the profile tube has two, opposite perforations extending in the longitudinal direction, into which the catch profile engages with radially inward projections. The perforations can extend up to the vicinity of the two ends of the profile tube.

At the end facing away from the outer nut, the propulsive tube can be connected to the housing of a motor that drives the catch device. In this configuration, the propulsive tube, the drive motor with its housing, and the catch device, which can be designed as a profile tube, for example, can form a single unit.

The second fixing device is expediently mounted on the side of the housing facing away from the propulsive tube, in concentric fashion relative to the rotational axis of the catch device.

To protect the threaded hollow spindle on the outside, an inner telescopic tube extending essentially over the length of the threaded hollow spindle can be provided, one end of which is guided in longitudinally sliding fashion on the propulsive tube and the other end of which is mounted in rotating and non-sliding fashion on the threaded hollow spindle.

For further protection of the inner spindle on the outside, an outer telescopic tube extending essentially over the length of the inner spindle can be provided, one end of which is guided in longitudinally sliding fashion on the inner telescopic tube and the other end of which is mounted in non-sliding and non-rotating fashion relative to the inner spindle. The first fixing device for mounting the device on one of the parts that can move relative to the other, can be designed such that the ends of the inner spindle and the outer telescopic tube facing away from the catch device are connected in non-rotating fashion to a plate-shaped foot perpendicular to them. A foot of this kind could, as one of the parts which can move relative to the other, form the supporting base of a table of adjustable height, while the other part, capable of absolute motion in the present example, would be the tabletop.

In order to limit the travel path, the inside of the propulsive tube is preferably equipped with limit switches that can be actuated by the threaded hollow spindle.

A practical example of the present invention is explained in more detail below on the basis of the drawing. The figures show the following:

FIG. 1 A device for adjusting parts that can move relative to each other, which can particularly be used to adjust the height of a table, in the fully retracted position, and FIG. 2 The device according to FIG. 1 in fully extended position.

As shown in the drawing, the device essentially comprises a driven threaded hollow spindle 1, with inner and outer threads in opposing directions, an inner spindle 2 that interacts with the inner thread of threaded hollow spindle 1, and a propulsive tube 4 that interacts via an outer nut 3 of threaded hollow spindle 1. The free end of inner spindle 2 is connected in non-rotating fashion to a plate-shaped foot 5, which can form the base of a table of adjustable height. The connection to foot 5 forms the first fixing device of the device. Second fixing device 6, e.g. for connecting the adjusting device to the underside of a tabletop, is connected to propulsive tube 4 in a manner described in more detail below.

As shown in the drawing, threaded hollow spindle 1 is mounted in a rotationally fixed and longitudinally displaceable manner on catch device 7, which can be rotationally driven about the axis of threaded hollow spindle 1.

Propulsive tube 4 connected to second fixing device 6 is fixed in the longitudinal direction relative to catch device 7. The rotation of driven catch device 7 causes threaded hollow spindle 1 to rotate, whereby it moves in the longitudinal direction relative to catch device 7 due to its interaction with outer nut 3 of propulsive tube 4. The relative displacement of threaded hollow spindle 1 is made possible by its longitudinally displaceable mounting on catch device 7.

As the drawing shows further, catch device 7 is designed as a profile tube, whose profile is engaged by a catch profile 8 provided on threaded hollow spindle 1. One end of the profile tube is connected in non-rotating fashion to motor shaft 9 of drive motor 10. Drive motor 10 is mounted in housing 11, which is mounted on the end of profile tube 4 that is opposite outer nut 3, where this end forms an opening for the passage of catch device 7, which is connected in fixed fashion to motor shaft 9. Second fixing device 6 is mounted in fixed position on the side of housing 11 facing away from propulsive tube 4, in concentric fashion relative to the rotational axis of catch device 7. Fixing device 6 is of plate-shaped design to allow mounting on the underside of a tabletop with screws, for example.

Drive motor 10 has a worm gear pair, meaning that it can be accommodated in a relatively slim housing extending laterally directly underneath the tabletop.

Housing 11 can be connected as a single piece, e.g. in the form of two housing shells, to the propulsive tube (which also comprises two shells in this case), or flanged-mounted on propulsive tube 4.

The catch device, which is designed as a profile tube, has two opposite perforations 12 extending in the longitudinal direction, into which catch profile 8 engages with radially inward projections. The perforations extend up to the vicinity of the two ends of the profile tube.

The end of threaded hollow spindle 1 facing away from catch device 7 is provided with an inside nut 13, which interacts with inner spindle 2. Inside nut 13 can be designed as an integral constriction of threaded hollow spindle 1, or connected to threaded hollow spindle 1 as a separate part.

The remaining area of threaded hollow spindle 1 is designed to accommodate catch device 7, which is designed in the form of a profile tube, in sliding fashion. Catch profile 8 comprises two opposite notches at corresponding points on threaded hollow spindle 1.

Catch device 7, which is designed in the form of a profile tube, inside nut 13, the remaining area of threaded hollow spindle 1 and inner spindle 2 are radially dimensioned such that the outer thread diameter of inner spindle 2 is smaller than the inside diameter of the profile tube.

To protect threaded hollow spindle 1 and inner spindle 2 on the outside, inner and outer telescopic tubes 14 and 15 are provided, which cannot rotate relative to propulsive tube 4. One end of inner telescopic tube 14 is guided in longitudinally sliding fashion on propulsive tube 4 and the other end is mounted in rotating and non-sliding fashion on the threaded hollow spindle by means of ball bearing 16, while one end of outer telescopic tube 15 is guided in longitudinally sliding fashion on inner telescopic tube 14, and the other end is mounted in non-sliding and non-rotating fashion relative to inner spindle 2. In the embodiment shown in the drawing, outer telescopic tube 15 is mounted in fixed position on foot 5 for this purpose.

To limit the travel path, the inside of propulsive tube 4 is equipped with limit switches 17 that can be actuated by the threaded hollow spindle.

List of Reference Numbers

1. Threaded hollow spindle
2. Inner spindle
3. Outer nut
4. Propulsive tube
5. Foot
6. Second fixing device
7. Catch device
8. Catch profile
9. Motor shaft
10. Drive motor
11. Housing
12. Perforation
13. Inside nut
14. Inner telescopic tube
15. Outer telescopic tube
16. Ball bearing
17. Limit switch

What is claimed is:

1. Device for adjusting parts which can move in relation to each other, comprising a driveable threaded hollow spindle (1), whose inner and outer threads rise in opposing directions, an inner spindle (2) which interacts with the inner thread of the threaded hollow spindle (1) and which is connected to a first fixing device in order to secure the device to one of the moveable parts, and a propulsive tube (4) which interacts with the outer thread of the threaded hollow spindle (1) via an outer nut (3) and is connected to a second fixing device (6) enabling fixation of the device on another of the parts which can move in relation to each other, where the threaded hollow spindle (1) is mounted in a rotationally fixed and longitudinally displaceable manner on a catch device (7) which can be rotationally driven about the axis of the threaded hollow spindle (1), and where a guard is provided for the thread of the threaded hollow spindle (1) that extends essentially over the length of the same, characterised in that the guard is designed as a telescopic tube (14), one end of which is guided in longitudinally sliding non-rotating fashion on the propulsive tube (4) and the other end of which is mounted in rotating and non-sliding fashion on the threaded hollow spindle (1).

2. Device according to claim 1, characterised in that the catch device (7) is designed as a profile tube, whose profile is engaged by a catch profile (8) provided on the threaded hollow spindle (1).

3. Device according to claim 2, characterised in that one end of the profile tube is connected to the motor shaft (9) of a drive motor (10) in non-rotating fashion.

4. Device according to claim 2, characterised in that one end of the profile tube extends into the threaded hollow spindle (1) and has a minimum inside diameter that is greater than the outer thread diameter of the inner spindle (2), and the catch profile (8) is mounted on the inside of the threaded hollow spindle (1) on the end facing the profile tube.

5. Device according to claim 4, characterised in that the end of the threaded hollow spindle (1) facing away from the profile tube is provided with a constriction, in which the inner thread is formed, and the remaining area is designed to accommodate the profile tube in sliding fashion.

6. Device according to claim 5, characterised in that the profile tube has two, opposite perforations (12) extending in the longitudinal direction, into which the catch profile (8) engages with radially inward projections.

7. Device according to claim 1, characterised in that the propulsive tube (4) is connected at the end facing away from the outer nut (3) to a housing (11) of a motor (10) that drives the catch device (7).

8. Device according to claim 7, characterised in that the second fixing device (6) is mounted on the side of the housing (11) facing away from the propulsive tube (4).

9. Device according to one of claim 1, characterised in that an outer telescopic tube (15), relative to the first telescopic tube (14), extending essentially over the length of the inner spindle (2) is provided, one end of which is guided in longitudinally sliding fashion on the inner telescopic tube (14) and the other end of which is mounted in non-sliding and non-rotating fashion relative to the inner spindle.

10. Device according to claim 9, characterised in that the ends of the inner spindle (2) and the outer telescopic tube (15) facing away from the catch device (7) are connected in non-rotating fashion to a plate-shaped foot (5) perpendicular to them.

11. Device according to claim 1, characterised in that the inside of the propulsive tube (4) is equipped with limit switches (17) that can be actuated by the threaded hollow spindle (1).

* * * * *

(12) EX PARTE REEXAMINATION CERTIFICATE (7028th)
United States Patent
Koch

(10) Number: US 6,880,416 C1
(45) Certificate Issued: Aug. 25, 2009

(54) DEVICE FOR ADJUSTING PARTS WHICH CAN MOVE IN RELATION TO EACH OTHER

(75) Inventor: Dietmar Koch, Gummersbach (DE)

(73) Assignee: Okin Gesellschaft fur Antriebstechnik mbH & Co., Gummersbach (DE)

Reexamination Request:
No. 90/010,031, Sep. 24, 2007

Reexamination Certificate for:
Patent No.: 6,880,416
Issued: Apr. 19, 2005
Appl. No.: 10/257,778
Filed: Oct. 15, 2002

(22) PCT Filed: Mar. 24, 2001
(86) PCT No.: PCT/DE01/01145
§ 371 (c)(1),
(2), (4) Date: Oct. 15, 2002
(87) PCT Pub. No.: WO01/78556
PCT Pub. Date: Oct. 25, 2001

(30) Foreign Application Priority Data

Apr. 15, 2000 (DE) ............................................. 10018742

(51) Int. Cl.
*A47B 9/00* (2006.01)
*A47B 9/04* (2006.01)
*B66F 3/10* (2006.01)
*B66F 3/00* (2006.01)
*B66F 3/08* (2006.01)
*F16H 25/20* (2006.01)

(52) U.S. Cl. .................... 74/89.35; 74/424.72; 74/89.28
(58) Field of Classification Search .................... None
See application file for complete search history.

(56) References Cited

FOREIGN PATENT DOCUMENTS

| DE | 3910814 | 10/1990 |
| DE | 4426937 | 11/1995 |
| FR | 2625488 | 7/1989 |
| FR | 2747280 | 10/1997 |

OTHER PUBLICATIONS

Grounds of Appeal (9 pgs) as filed by Opponent in related EP case dated Oct. 24, 2007 and English translation (7 pgs).
Interim Decision of the EPO dated Jun. 19, 2007, received in Application No. 01 927 597.3—Patent No. 1274330, 9 pgs.
English translation of the Interim Decision dated Jun. 19, 2007, received in Application No. 01 927 597.3—Patent No. 1274330, 8 pgs.
Notice of Opposition dated Jun. 2, 2004 from Linak, 7 pgs.
Translation of Patentee's Response dated Oct. 17, 2005 from Lippert, Stachow & Partner, with amended patent claims, 20 pgs.
Reply to Response dated Feb. 10, 2006 from Linak, 2 pgs.

*Primary Examiner*—David O. Reip

(57) ABSTRACT

A device for adjusting parts which can move in relation to each other includes: a driveable threaded hollow spindle with inner and outer threads increasing in opposing directions; an inner spindle cooperating with the inner threads and connected to a first fixing device to secure the device to one of the moveable parts; and a propulsive tube cooperating with the outer threads via an outer nut. The propulsive tube is connected to a second fixing device enabling fixation on one of the parts which can move in relation to each other. The threaded hollow spindle may be mounted in a rotationally fixed and longitudinally displaceable manner on a catch device which can be rotationally driven around the axis of the hollow spindle.

EX PARTE
> REEXAMINATION CERTIFICATE
> ISSUED UNDER 35 U.S.C. 307
>
> THE PATENT IS HEREBY AMENDED AS
> INDICATED BELOW.
>
> Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1 and 3–11 are determined to be patentable as amended.

1. Device for adjusting parts which can move in relation to each other, *especially parts of adjustable furniture*, comprising a driveable threaded hollow spindle [(1)], whose inner and outer threads rise in opposing directions, an inner spindle [(2)] which interacts with the inner thread of the threaded hollow spindle [(1)] and which is connected to a first fixing device in order to secure the device to one of the moveable parts, and a propulsive tube [(4)] which interacts with the outer thread of the threaded hollow spindle [(1)] via an outer nut [(3)] and is connected to a second fixing device [(6)] enabling fixation of the device on another of the parts which can move in relation to each other, where the threaded hollow spindle [(1)] is mounted in a rotationally fixed and longitudinally displaceable manner on a catch device [(7)] which can be rotationally driven about the axis of the threaded hollow spindle [(1)], *the catch device being designed as a profile tube, whose profile is engaged by a catch profile provided on the threaded hollow spindle, an outer thread diameter of the inner spindle being smaller than an inside diameter of the profile tube* and where a guard is provided for the thread of the threaded hollow spindle [(1)] that extends essentially over the length of the same, characterised in that the guard is designed as a telescopic tube [(14)], one end of which is guided in longitudinally sliding non-rotating fashion on the propulsive tube [(4)] and the other end of which is mounted in rotating and non-sliding fashion on the threaded hollow spindle [(1)].

3. Device according to claim [2] *1*, characterised in that one end of the profile tube is connected to the motor shaft [(9)] of a drive motor [(10)] in non-rotating fashion.

4. Device according to claim [2] *1*, characterised in that one end of the profile tube extends into the threaded hollow spindle [(1)] and the catch profile [(8)] is mounted on the inside of the threaded hollow spindle [(1)] on the end facing the profile tube.

5. Device according to claim 4, characterised in that the end of the threaded hollow spindle [(1)] facing away from the profile tube is provided with a construction, in which the inner thread is formed, and the remaining area is designed to accomodate the profile tube in sliding fashion.

6. Device according to claim 5, characterised in that the profile tube has two, opposite perforations [(12)] extending in the longitudinal direction, into which the catch profile [(8)] engages with radially inward projections.

7. Device according to claim 1, characterised in that the propulsive tube [(4)] is connected at the end facing away from the outer nut [(3)] to a housing [(11)] of a motor [(10)] that drives the catch device [(7)].

8. Device according to claim 7, characterised in that the second fixing device [(6)] is mounted on the side of the housing [(11)] facing away from the propulsive tube [(4)].

9. Device according to one of claim 1, characterised in that an outer telescopic tube [(15)], relative to the first telescopic tube [(14)], extending essentially over the length of the inner spindle [(2)] is provided, one end of which is guided in longitudinally sliding fashion on the inner telescopic tube [(14)] and the other end of which is mounted in non-sliding and non-rotating fashion relative to the inner spindle.

10. Device according to claim 9, characterised in that the ends of the inner spindle [(2)] and the outer telescopic tube [(15)] facing away from the catch device [(7)] are connected in non-rotating fashion to a plate-shaped foot [(5)] perpendicular to them.

11. Device according to claim 1, characterised in that the inside of the propulsive tube [(4)] is equipped with limit switches [(17)] that can be actuated by the threaded hollow spindle [(1)].

\* \* \* \* \*